United States Patent [19]

Monte et al.

[11] Patent Number: 5,183,398

[45] Date of Patent: Feb. 2, 1993

[54] APPARATUS AND METHOD FOR INTERACTIVE INSTRUCTION OF A STUDENT

[75] Inventors: Charles Monte, Sepulveda; Norman A. Worthington, III, Woodland Hills; Jonathan Mandel, Chatsworth; Gary F. Davenport, Claremont, all of Calif.

[73] Assignee: The Software Toolworks, Novato, Calif.

[21] Appl. No.: 532,272

[22] Filed: Jun. 1, 1990

[51] Int. Cl.$^5$ .................. G09B 13/00; G09B 15/00
[52] U.S. Cl. .................. 434/227; 84/470 R; 84/478
[58] Field of Search ............ 434/227; 84/115, 478, 84/470 R, 423 R, 609-614, 634, 635

[56] References Cited

U.S. PATENT DOCUMENTS

| | | | |
|---|---|---|---|
| 3,482,480 | 12/1969 | Decker | 434/335 |
| 3,897,710 | 8/1975 | Schmoyer | 434/314 |
| 3,915,047 | 10/1975 | Davis et al. | 84/115 |
| 4,281,579 | 8/1981 | Bennett, Sr. | 434/227 |
| 4,314,499 | 2/1982 | Olsen | 434/227 |
| 4,344,344 | 8/1982 | Nakada et al. | 84/478 |
| 4,364,299 | 12/1982 | Nakada et al. | 84/478 |
| 4,378,720 | 4/1983 | Nakada et al. | 84/478 |
| 4,416,182 | 11/1983 | Wise et al. | 84/470 R |
| 4,419,920 | 12/1983 | Ohe | 84/115 |
| 4,694,723 | 9/1987 | Shinohara et al. | 84/478 |

Primary Examiner—Richard J. Apley
Assistant Examiner—John P. Leubecker
Attorney, Agent, or Firm—Matthew F. Jodziewicz

[57] ABSTRACT

An apparatus and method for instruction of a student which includes interactive guidance of the student through a series of lesson frames includes providing the student with a keyboard having a plurality of keys corresponding to the notes of a musical scale and generating a key relation signal in response to each depressed or released key. A video display has an audio tone generator associated therewith enabling the student to respond to the visually displayed images and audio tones by selecting one or more of the keys on the keyboard. The student is presented with a lesson frame representing an instructional activity requiring a response by the student on the keyboard. The student keyboard response is compared with a performance standard and an absolute performance evaluation result is generated. The absolute performance evaluation result is compared with an acceptable achievement level for the particular instructional activity and a next frame selection signal is generated. A next frame is selected for presentation to the student based upon the next frame selection signal.

29 Claims, 5 Drawing Sheets

APPARATUS AND METHOD FOR INTERACTIVE INSTRUCTION OF A STUDENT

NOTICE REGARDING COPYRIGHTED MATERIAL

A portion of the disclosure of this patent document contains materials which are subject to protection under the Copyright Laws. The copyright owner has no objection to the facsimile reproduction by anyone of the patent document or the patent disclosure as it appears in the Patent and Trademark Office patent file or records, but otherwise reserves all rights whatsoever under the Copyright Laws.

BACKGROUND OF THE INVENTION

1. Field of the Invention

This invention relates in general to both an apparatus and a method for learning various subjects, and, more particularly, to an apparatus and method for instruction of a student which includes the interactive guidance of the student through a series of tasks contained in lesson frames by comparing the student's performance of the task in a particular lesson frame both with a set of absolute performance standards for the task and with acceptable performance standards for the task.

2. Description of the Related Art

Computer aided instruction has entered the home market for teaching various subjects as diverse as beginning reading through college-level subjects. The computer acts as a tireless, personal teacher, with infinite patience, working at the student's pace, and is available whenever the student desires to study.

In the area of music instruction, the computer has been used, for the most part, to provide the student with a preselected programmed sequence of learning activities that the student is to perform. In some "interactive" programs, the student's response to each learning activity is evaluated on a pass/fail basis. If the student correctly performed the particular learning activity, the next learning activity in the programmed sequence is presented. If the student failed to perform the particular learning activity correctly, the learning activity is re-presented to the student for another try at mastering the activity and responding correctly. In many instances the student is cycled through a single learning activity until a correct response is made.

A major problem with these prior art learning systems is that they fail to adapt to the particular abilities of a student, and present instead a lock-step, pass/fail teaching method that does not modify its presentation of learning activities to respond to the special needs of the student in learning the subject. This pass/fail method does not provide the student with a learning method that truly teaches the student the subject, but merely "presents" the subject to the student for rote repetition, thereby leading in many instances to student frustration and boredom.

The present invention overcomes this inflexible presentation approach to learning found in prior art systems by providing a system that constantly evaluates a student's performance and based upon such an evaluation, interactively chooses the best suited learning task for the student to master next.

OBJECTS AND SUMMARY OF THE INVENTION

It is an object of the present invention to provide a teaching device in the form of a keyboard and processing unit running under a program which selectively chooses and presents the student with learning activities, or tasks, based upon a comparison and evaluation of the student's response to a preceding task with both an absolute performance standard for the task and an acceptable performance standard for the particular task.

It is a further object of the present invention to provide an audio-visual teaching device which enables a student's response to a presented learning activity to control learning activity that is next presented the student.

It is yet another object of the present invention to provide an apparatus and method for the instruction of a student that stimulates the interest of a student by analyzing the student's progress through the course and chooses the most appropriate learning activity for the student to master next.

It is still yet another object of the present invention to provide an apparatus and method for the instruction of a student that stimulates the interest of a student by offering an variety of modes that further enhances and masks the traditional educational methods.

It is an object of the present invention to provide an apparatus and method for the instruction of a student for keyboard, as well as other non-keyboard type of musical instruments.

In general, the present invention is embodied in an apparatus for instruction of a student which includes interactive guidance of the student through a series of lesson frames that contain particular tasks for the student to complete. The apparatus is controlled by a set of preprogrammed instructions that compare the student's performance of a learning activity presented in a particular lesson frame both with a set of absolute performance standards for the learning activity itself, and a set of acceptable performance standards for the learning activity as presented in the particular lesson frame.

The apparatus, as used for musical instruction or for learning a keyboard instrument, includes a musical keyboard having a plurality of manually operable piano type keys arranged in the conventional piano keyboard for generating a key relation signal in response to each depressed or released key among its keys. The key relation signal corresponds to, and is representative of, a timing reference, a reference key number, and a reference velocity value indicating the amount of force used to depress or release the key. Other information that may be represented by the key relation signal would include, but need not be limited to, polypressure, channel pressure, release velocity, and variable foot pedal events.

A predetermined program is contained in storage and includes a sequence of instructional lesson frames. each frame including: 1) a first signal group of signals representing an instructional learning activity with a first portion of the group corresponding to an audio display and a second portion corresponding to a video display; 2) a second group of signals associated therewith representing desired values for the signals of the first group representing an acceptable achievement level for the associated instructional learning activity in that particular lesson frame; and 3) a sequence of performance standards for the instructional learning activities in all of the instructional frames.

An evaluator device generates a performance signal representing the results of a comparison between the key relation signals and the performance standards. The evaluator then generates a next frame selection signal depending upon the comparison results.

A controller is connected to the storage and the evaluator for generating audio control signals and video control signals to present an instructional frame in accordance with an applied next frame selection signal. A sound generator is connected to the controller for producing audible sounds in response to the first signal group first portion signals of the chosen frame, and a video display is connected to the controller for producing a visually displayed image to the student in response to the first signal group second portion signals.

The present invention is also embodies in a method for the instruction of a student which includes the interactive guidance of the student through a series of instructional activities which are presented in a series of lesson frames. The student's performance of a particular instructional activity found in a presented lesson frame is compared both with a set of absolute performance standards for the activity and with a set of acceptable performance standards for the activity as associated with that particular presented lesson frame.

The method, as applied to the teaching of music or a keyboard musical instrument, includes the steps of providing the student with a musical keyboard and generating a key relation signal in response to each depressed or released key among said keys; providing means for generating audio tones and displaying video images on a monitor including video display means and an audio tone generating means associated therewith, thus enabling the student to respond to the visually displayed images and audio tones by playing one or more of the keys; presenting the student with a lesson frame containing a video image requiring a response that the student is to perform on the keyboard; comparing the student keyboard performance against a first performance standard for generating an "absolute" performance evaluation result; comparing the absolute performance evaluation result just generated with an acceptable achievement level for the particular instructional activity presented in that lesson frame and generating a next frame selection signal based on the comparisons; and, selecting the appropriate frame to present next to the student, in response to the next frame selection signal.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

The following detailed description is of the best presently contemplated mode of carrying out the present invention. This description is not intended in a limiting sense, but is made solely for the purpose of illustrating the general principles of the invention.

Figure 1:
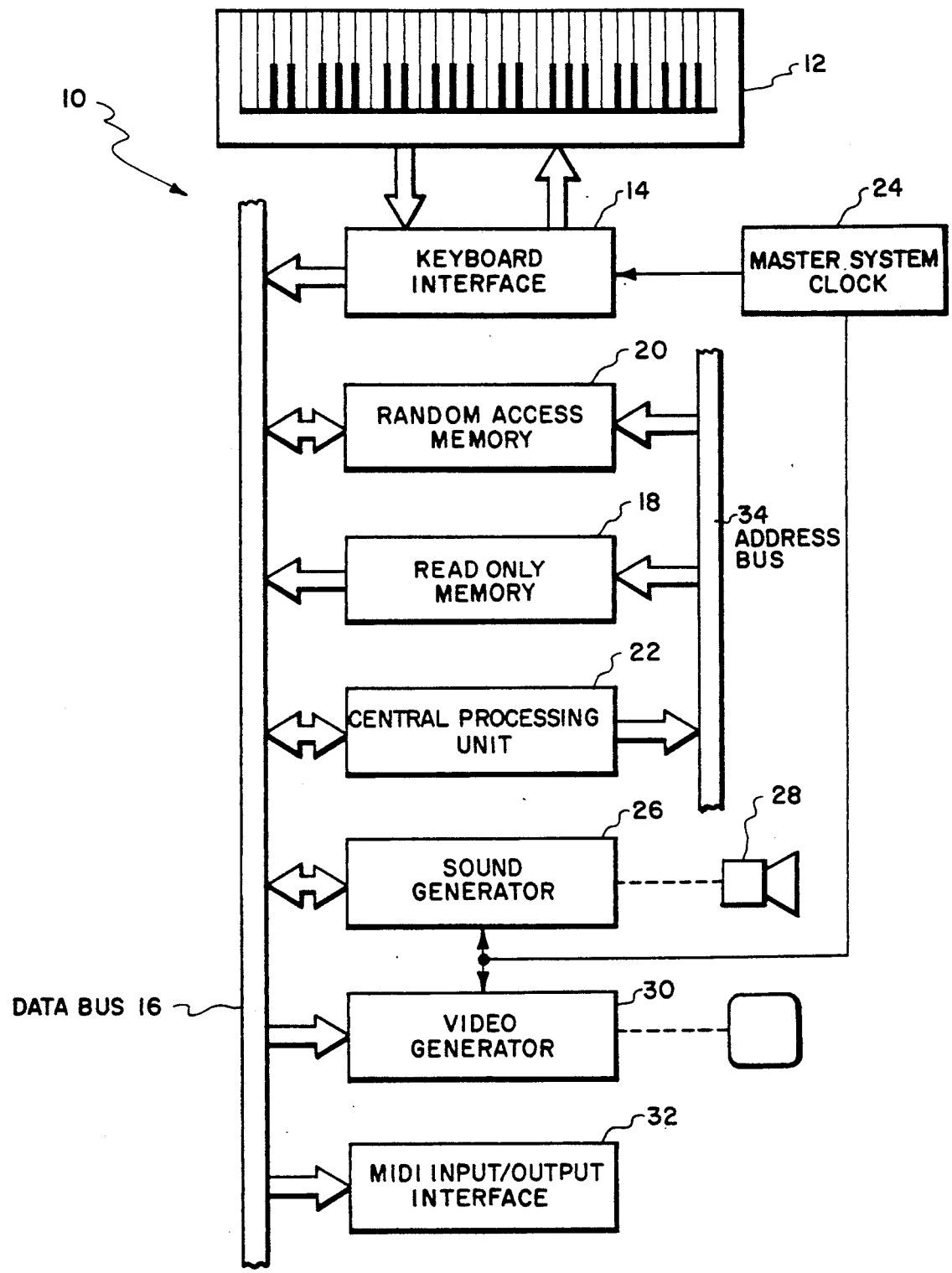
FIG. 1 is a block diagram of the apparatus of the present invention as embodied in a keyboard teaching device.

Referring now to the drawings in detail, wherein like numerals indicated like elements, there is shown in FIG. 1, a preferred apparatus 10, constructed in accord with the present invention for the instruction of a student in music theory, or in the use of keyboard musical instruments. This preferred apparatus would include the interactive guidance of the student through a series of instructional lesson frames, each containing an instructional task for the student to complete, by comparing the student's performance or response to the task in the lesson frame with both a set of absolute performance standards for the task, and with acceptable performance standards for the task.

Apparatus 10 comprises, a musical keyboard 12 having a plurality of manually operable keys for generating a key relation signal in response to the actuation of each key. This key relation signal corresponds to and is representative of a timing reference, a reference key number, and a reference velocity value indicating the amount of force used to operate the key.

In the preferred embodiment, an apparatus constructed in accord with the present invention, would include a musical-type keyboard and generates standard MIDI signals as an output for internal use in the apparatus, or for possible external use as better described below.

Keyboard 12 is connected to keyboard interface logic 14, which permits keyboard 12 to communicate with the remaining devices via a Data Bus 16. Data Bus 16 is bidirectional and enables transfer of data among system elements.

A Read-Only-Memory or ROM 18 is connected to Data Bus 16 and contains firmware necessary for the operation of the invention; the contained firmware will be explained hereinafter. The ROM 18 can be assembled from commercially available devices such as the 32K × 8 family of ROMs manufactured by Gould/AMI.

A Random Access Memory or RAM 20, is used for temporary storage of tables, parameters, and the like, as well as for storage of video display information. RAM 20 can be assembled from 8K × 8 static RAM devices such as the HM6264P-15 manufactured by Hitachi Corporation.

The Central Processing Unit or CPU 22, is the controlling device for the entire system and is a standard microprocessor having 8K of on-board or external ROM. Any of the commercially available microprocessors, such as the Zilog Z-80, or the 8051, 8052, 8080, 8086 or 80×86 family of microprocessors manufactured by Intel Corporation of Santa Clara, Calif., or any similar commercially available device can be used for the Central Processing Unit 22.

A Master System clock 24 is preferably a crystal controlled oscillator for stability which originates and synchronizes system timing.

Sound generator 26 is connected via Data Bus 16 to both RAM 20 and ROM 18 to respond to audio or sound generation data signals contained therein, and generates an audio frequency signal suitable for driving a pair of speakers 28. Sound generator 26 can be any of the commercially available digital or analog sound generators such as those manufactured by SGS/Thompson.

Likewise, a video generator 30 is connected via Data Bus 16 to both RAM 20 and ROM 18 to respond to the video display data from these devices and to generate a video frequency signal suitable for reception on a standard television or video display monitor.

Finally, an Input/Output interface 32 is connected to Data Bus 16 to provide a means by which data may be entered into the system via Data Bus 16. One preferred Input/Output Interface 32 is an RS-232 line driver used either alone, or in connection with a pair of MIDI jacks to allow for input/output of data into or from the system so as to allow communication with other auxiliary devices. An Address Bus 34 specifies locations in ROM 18 and RAM 20 where data may be stored or retrieved.

In general operation, apparatus 10 uses ROM 18 and RAM 20 as storage devices having a predetermined firmware program contained therein. This firmware program may include a sequence of code signals representing a series of instructional frames, or a sequence of code signals designed to control the sound generation, keyboard and Input/Output portions of the apparatus. In the Computer, each instructional frame contains: 1) a first signal group of signals representing an instructional activity to which the student responds or which the student is to perform, with a portion of the group corresponding to an audio display and a second portion corresponding to a video display; 2) a second signal group is associated with the frame and represents desired values for the student response to the activity corresponding to represent an acceptable achievement level; 3) a group of signals representing a sequence of substantially perfect performance responses for the instructional activities presented in all of the frames, that is, the perfect performance responses are the set of absolute performance standards for the instructional activities in all of the frames.

In the preferred embodiment of the invention being described, the sequence of performance standards for the instructional activities is presented to the student in each of the lesson frames would be structured to include a group of parameters that would represent various categories of concern to determine whether or not the student has successfully mastered all of the instructional activities being presented to him in the lesson frame. Such parameters would correspond to such topics as correct key response, the timing between played keys, the duration of a played key, overall duration of the assigned task.

These parameters could all carry equal weight or could be assigned unequal weight for use in generating the evaluated performance signal, which represents the results of a comparison between the key relation signals produced by the student's performance and the absolute performance standards for the instructional task based on the performance of a master musician.

Likewise, the second group of signals associated with the lesson frames, representing an "acceptable achievement level" for the associated instructional activity of the particular frame, would be structured to include a second group of parameters having categories corresponding to the same categories in the first group of parameters and would represent the performance of a journeyman musician or a skilled amateur.

Thus, by assigning the categories in the second group of parameters with predetermined weights, a matrix can be formed for "masking" or comparing the student's level of response in each category on an absolute basis with that of a desired achievement level for each categories for that particular lesson frame. This comparison is used in determining the next frame selection signal. The choice of the next frame is based upon the comparison of the student's performance with the absolute performance signal (the master musician) and with the acceptable achievement level signals (the journeyman musician).

The present invention evaluates the student's response in a two step method which is then used in deciding which instructional activity frame to next present the student. The first step is to mask, or compare, the student's actual response to the instructional activity of the presented frame with the set of absolute performance standards for the presented frame. This comparison is the evaluated performance signal described above. The second step in the evaluation process is the masking or comparison of this evaluated performance signal with the acceptable achievement level for the particular instructional activity frame to produce the next frame selection signal. It is in this second comparison that the instructional goals, that is, the acceptable level of achievement, are provided for the particular instructional activity frame that the student is performing. In this manner, the present invention performs interactively with the student, the student being the deciding factor in the learning process and the invention tailoring its presentation to the student's actual performance. The present invention therefore does not merely respond to a set pattern of instruction, but adapts its selection of the next instructional activity frame presented the student based upon the student's performance of the preceding instructional activity frame and whether or not its achievement goals were met by the student. It is this interactive, two-step evaluation that stimulates the interest of the student by analyzing the student's progress through the course and chooses the most appropriate learning activity for the student to master next.

By varying the weight assigned to each individual category to correspond to the first signal group of signals, a single set of parameters and absolute performance standards may be used against specific achievement standards for each individual lesson frame, resulting in both economy of logic and speed of execution.

These instructional frames can present both an audio and a visual display such as a game, Grandstaffs of music, pictures of the keyboard, etc. for the student to study, copy or respond to with a keyboard response.

Central Processing Unit 22 acts as an evaluator for generating a performance signal representing the results of a comparison between the series of key relation signals generated as a result of the student depressing and releasing keys on the keyboard, and the absolute performance standards contained in ROM 18 and RAM 20.

In other preferred embodiments of the present invention, the sequence of code representing various control and comparison sequences may also be embodied in external ROM, RAM or even an external CPU linked to CPU 22.

CPU 22 compares a preselected set of test goals, such as, but not limited to, overall timing for the piece, number of wrong notes, timing between individual notes, time of played notes, use of pedals, etc., with those results actually generated by the student on the keyboard in response to the particular instructional task that is presented in the lesson frame being displayed to the student.

Once the evaluation of the student's response is made against the "absolute" standard for the instructional task, CPU 22 then continues to evaluate the student's performance against a predetermined, lower standard considered to be an acceptable achievement level to satisfy the requirements of the instructional lesson of that instructional frame and its associated task. If the comparison indicates that the student has successfully mastered the task, the next frame signal generated selects that instructional lesson frame which will next be presented to the student for study.

CPU 22 also provides a control device for generating audio and video control signals to present to the student both aurally and visually, the next instructional frame in accordance with the next frame selection signal generated by the last comparison. This selection is based upon empirical data and chooses the best available frame for the progress of the student.

Almost any type of sound generator 26 or video display generator 30, may be utilized in apparatus 10, for producing audible sounds and a visually displayed image to the student in response to the first and second set of control signals. A preferred embodiment would include a digital sound generator working in association with a video display monitor as found in many computer systems communicating with apparatus 10 through an RS-232 line driver acting as the Input/Output Interface 32. Likewise, any other compatible audio-visual device could be connected to apparatus 10 through MIDI input/output jacks acting as the Input/Output Interface 32.

Figure 2:
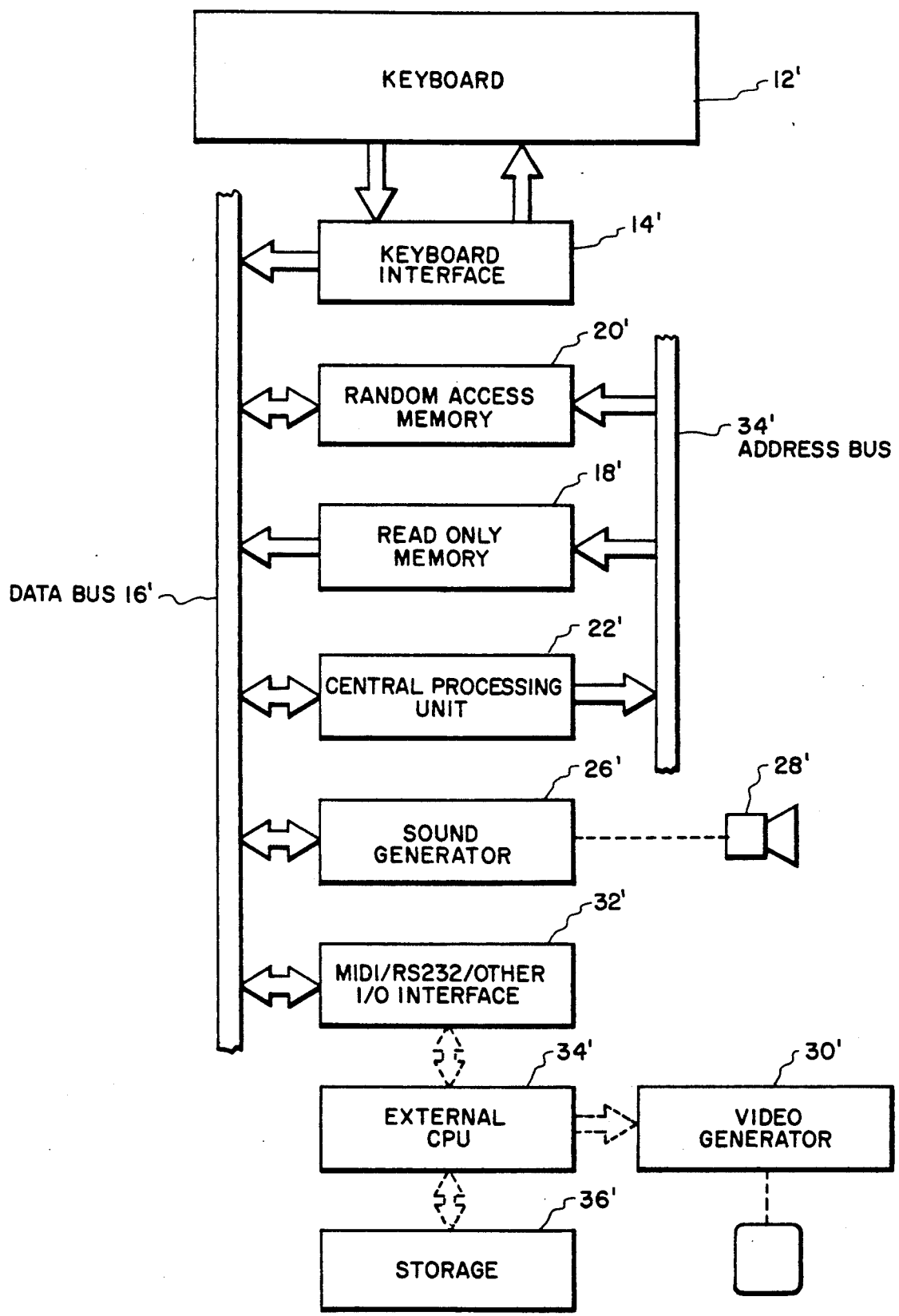
FIG. 2 is a block diagram of an alternate preferred embodiment of the invention to that shown in FIG. 1.

A second preferred embodiment of the present invention is shown in FIG. 2, where similar elements to those discussed above appearing in FIG. 1 are indicated by a prime following the reference number. Referring the reader to the description for those elements in common between the two embodiments, the following description will discuss those elements differing between the two embodiments.

In this second preferred embodiment, video generator 30' is connected to an external Central Processing Unit 34' through Input/Output Interface 32'. Additional external storage 36' including ROM and RAM may be connected to external Central Processing Unit 34' to contain the necessary firmware or software needed to control the video generator 30'. In this second embodiment, the various tasks controlled by internal CPU 22' may be allocated between internal CPU 22' and external CPU 34'. In fact, Input/Output Interface 32' may connect to a commercially available computer video arcade game system and utilize the existing audio and video generator means found therein in creating and presenting its lesson frames. Likewise, the sequences of controlling codes may be found in either internal storage units such as RAM 20' or ROM 18, or in external storage units as shown by reference numeral 36 for the control of the various system elements.

Figure 3:
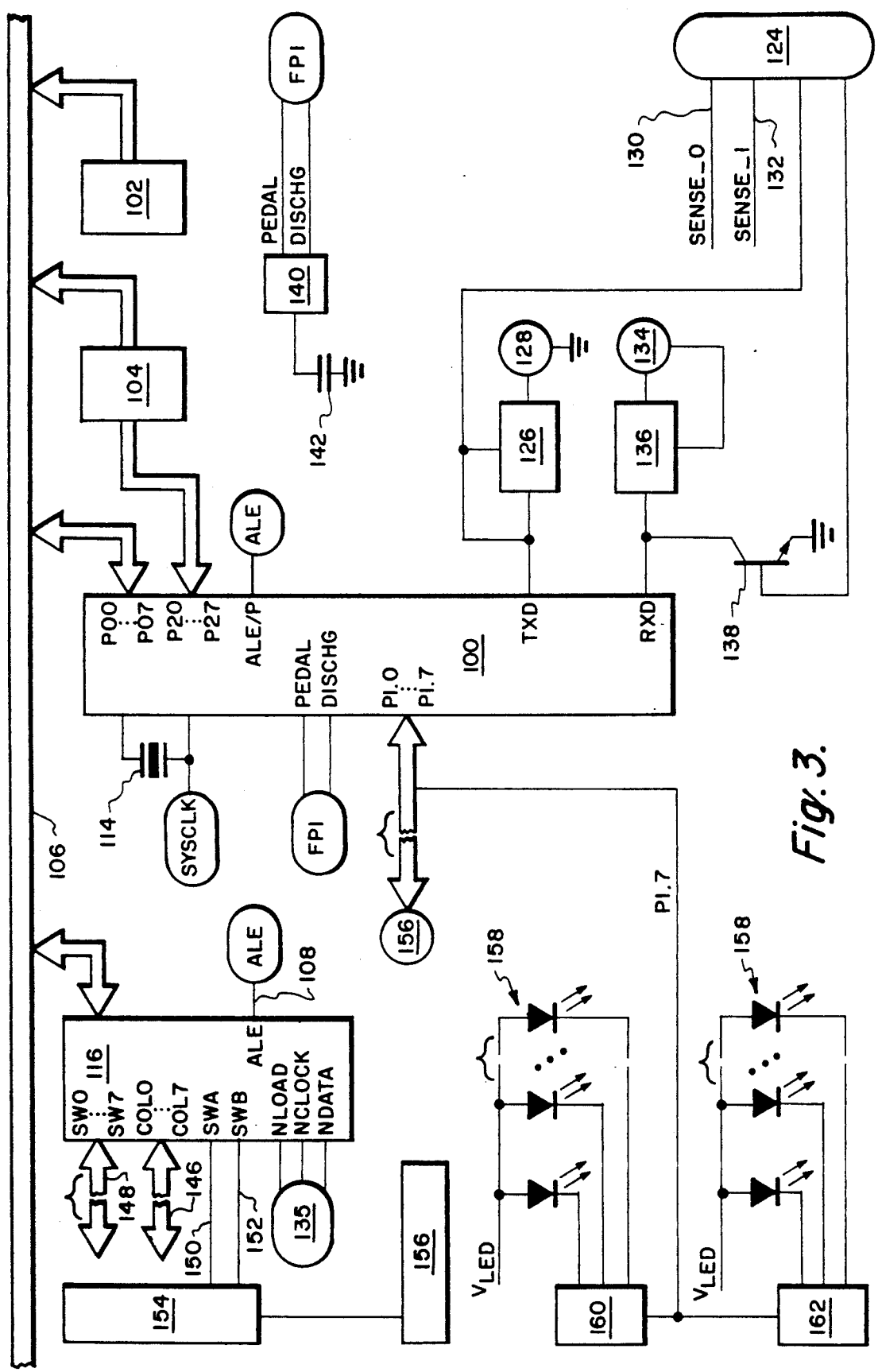
FIGS. 3 and 4 illustrate a preferred schematical embodiment of the present invention.
Figure 4:
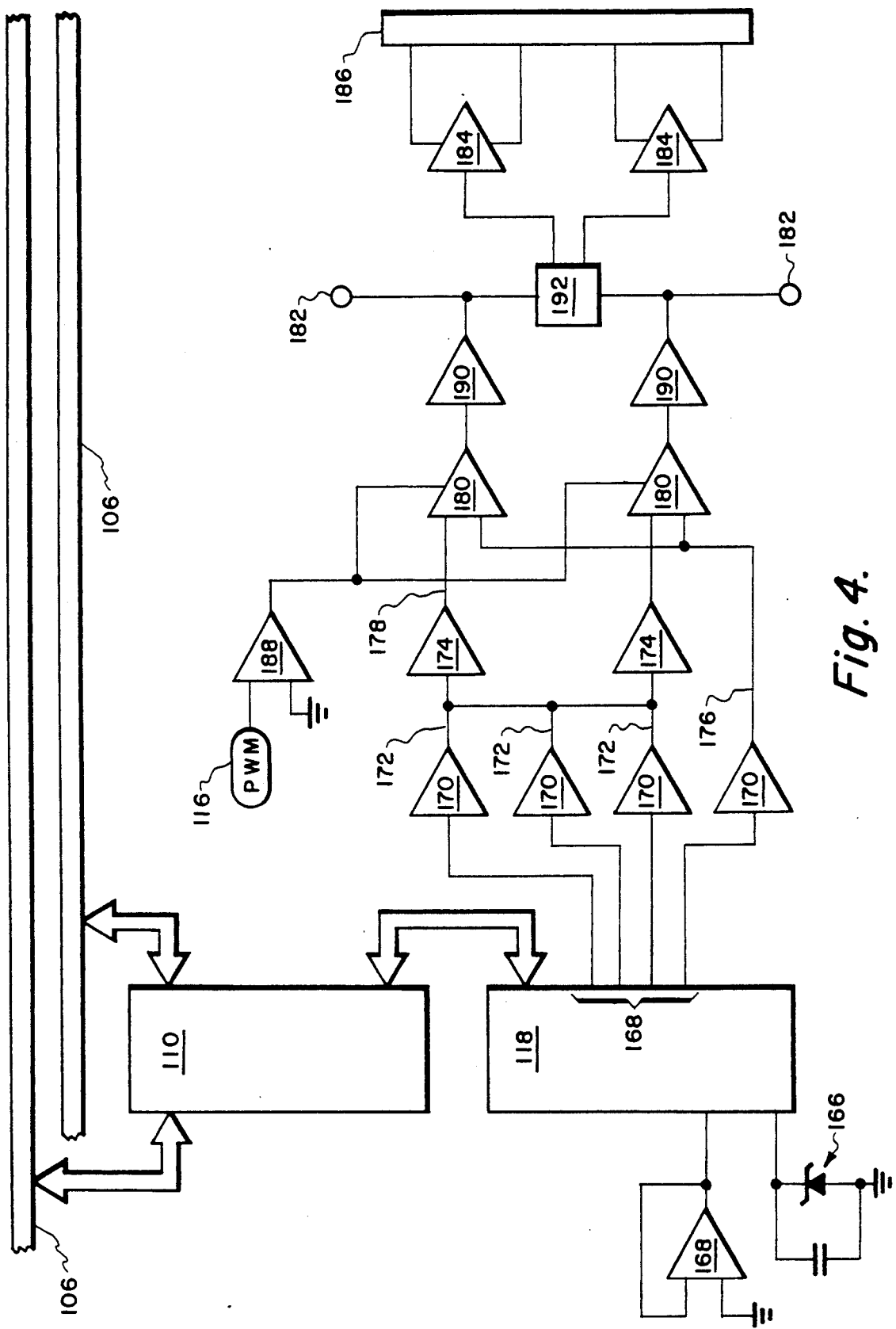

FIGS. 3 and 4 illustrate a preferred schematical embodiment of the present invention as described above. In FIG. 3, microprocessor 100 controls the overall operation of the device by transferring addresses and data in the conventional manner through address and data buses 106. The control program is stored in Read Only Memory (ROM) 102. Random Access Memory (RAM) 104 is also used and accessed by the microprocessor 100 via data bus 106. The lower eight bits of the 16 bit microprocessor address bus are preferably multiplexed with the eight bit data bus for efficiency of overall data flow management through out the system architecture. Address latches are used to separate the addresses from the data being multiplexed through the bus system. For example, address latch 108 on the Keyboard ASIC 116 internally uses the ALE signal from the microprocessor to separate this address from the data, while the Glue ASIC 110 (see FIG. 4) also has an address latch which separates the addresses used externally by the program ROM 102 and RAM 104.

Microprocessor 100's on-board 12 MHz clock oscillator 114 is buffered and acts as a system clock (SYSCLK) to supply clock signals for the Keyboard ASIC 116 and the Glue ASIC 110 as well as where needed throughout the system. Glue ASIC 110 divides the 12 MHz microprocessor clock by three to provide a 4 MHz square wave to the sound chip 118 (See FIG. 4).

The microprocessor has an on-board UART 120 that is used both for MIDI and RS-232 communications. The TXD output 122 of the microprocessor UART drives the RS-232 port 124 through the level translating chip 126. Chip 126 is also used to drive the MIDI out port 128, which can be disabled by bringing the SENSE_0 line 130 low (pin 14 on the RS-232 connector). The SENSE_1 line 132 is used to select the UART Baud rate, which may be either 31250 or 9600. The MIDI input 134 and the RS-232 input from connector 124 are logically ORed together, to operate with only one input active at a time. Driving both inputs simultaneously will result in unpredictable behavior.)

Additional inputs to the microprocessor which use a different transmission method than MIDI or RS-232, may be made through interface 135 and a special interface 135 on the Keyboard ASIC 116 may be used to communicate with these other devices using, for example, but not limited to, three signal lines, as inputs NLOAD and NCLOCK, and as an output NDATA.

Likewise, analog inputs to the system may be accomplished by interfacing the musical instrument output containing analog data to a corresponding series of analog inputs to an analog/digital conversion chip 196 which, in turn, communicates with microprocessor 100 via the data bus 106. With this configuration, analog data may be input to the system for processing in the same manner as digital data.

The footpedal interface 140 measures the charging time of capacitor 142 through the variable resistance of the footpedal to come up with a number which is compared by the microprocessor against an internal reference to determine if the pedal is set off or on. This measurement is made periodically, with capacitor 142 discharged by microprocessor output DISCHG 144 after each reading.

The Keyboard ASIC 116 scans a matrix of switches 154 on the keyboard 156 by sequentially selecting one group of eight keys at a time with signals COL0 to COL7, collectively 146, and reading the switch status on lines SW0 to SW7, collectively 148. Each key has two mechanical switches which close in sequence as a key is pressed or released. Complementary signals SWA and SWB, 150 and 152 respectively, determine which of these two switches is read. The elapsed time between the closure of the first switch and the second switch determines the note-on velocity, which is computed by the Keyboard ASIC 116, and transferred along with the note number to the microprocessor 100 through an interrupt procedure. The elapsed time between the opening of the first switch and the opening of the second switch upon release of the key will determine the release velocity, which is computed by the Keyboard ASIC 116, and transferred along with the note number to the microprocessor through an Interrupt procedure.

A number of LEDs, preferably sixteen, 158 collectively, are driven by the outputs of the two shift registers 160 and 162. Microprocessor ports P1.0 and P1.1 supply the data inputs while P1.7 is used to clock the data in. Every time the LED status must be changed, the microprocessor shifts an entire group of 16 bits into these registers, where it then remains unchanged until the next time an update is required.

The digital sound chip 118 (see FIG. 4), preferably a Thomson/SGS J004 Digital Sound Chip, contains the hardware necessary to play a wavetable sample, create amplitude and mixing envelopes and set individual volumes for up to 16 simultaneous voices. The microprocessor controls the sound chip through commands sent over a six bit data bus, controlled by a strobe line. Wavetable samples may be stored in the sound chip itself or in ROM, and are capable of being extended through the use of a latch and register file (part of Glue ASIC chip 110). The voice number currently accessing the ROM is multiplexed on the lower four ROM address lines. This voice number is used to locate an address stored in the register file by the microprocessor, which is presented to the upper address bits of the ROM. This allows each voice on the sound chip to access a different block of memory and play a different kind of sound.

The sound chip's digital to analog converter requires a stable reference of approximately 2.5 volts, which is provided by Op-amp 164. Zener diode 166 limits an internal high voltage generator to 12 volts. Four outputs 168 provide pulse amplitude modulated signals which are integrated by op-amps 170. Three channels 172 are further filtered and panned left and right by summing amplifiers 174. The remaining unfiltered output 176, and the filtered outputs 178, are mixed together at the input to voltage controlled amplifier 180. The output of the Voltage Controlled Amplifier 180 drives the headphones and RCA jack outputs 182 through amplifiers 190. When headphones are not plugged in, the signals continue on through stereo phonejack switch 192, to power amplifier 184, which may drive speakers connected to speaker connector 186.

Voltage Controlled Amplifier 180 is controlled by a Pulse Width Modulated signal output rom Keyboard ASIC 116 which is filtered and buffered by amplifier 188. The microprocessor controls the pulse width according to the master volume setting.

The power supply for the device, not shown, uses a conventional 12 volt AC external transformer. This voltage is rectified, filtered and regulated to various levels as required by the circuitry and commonly known in the art.

Another preferred embodiment of the present invention would be in a method for instruction of a student in music theory, the playing of an instrument, both keyboard and non-keyboard, such as, guitars, drums, and the like, or the use of a musical keyboard, which includes interactive guidance of the student through a series of lesson frames by comparing the student's performance of an instructional task presented in a particular lesson frame with both a set of absolute performance standards and acceptable performance standards.

Likewise, the keyboard means described herein in the preferred embodiments can be replaced by other musical instrument means in other various musical categories of instruments such as wind, percussion, string, brass, and may include, but not be limited to, such items as guitar fretboards and drum pads.

Such a preferred method comprises the steps of first providing the student with a piano type keyboard having a plurality of manually operable piano keys each capable of generating a key relation signal in response to the actuation of the key. The generated key relation signal corresponds to and represents a combination of a timing reference, a reference key number, polypressure and/or channel pressure, and a reference velocity value indicating the amount of force used to depress the key, or release the key. The polypressure, and/or channel pressure indicates the pressure needed to hold the key down. As indicated above, a preferable keyboard is a keyboard that itself generates data representing key actuation, or connects to an external CPU for generating such data, for each played key, and may even produce an audio tone for each played key.

A storage device is provided capable of storing a predetermined program including a sequence of instructional frames. Each frame is comprised of three sets of signals. A first group of signals represents an instructional activity. A portion of the first group corresponds to an audio display and a second portion of the group corresponds to a video display.

A second group of signals associated with the first group represents desired values for a performance according to the tasks of the first group. These desired values represent an acceptable achievement level for the performance of associated instructional activity. A third group represents a sequence of performance standards for all instructional activities in the lesson frames.

The results of a comparison between the key relation signals generated by the student in responding to the instructional task presented him by a particular frame with the absolute performance standards, are evaluated and a performance signal corresponding to and representative of this comparison is generated.

A next frame selection signal is generated in response to the comparison results and the performance signal. Based on empirical data and predetermined algorithms, the next lesson frame that will be presented the student for review is selected and is believed to be optimally suited to the skills and the needs of the student for steady advancement.

Audio and video control signals are generated, presenting a new instructional frame in response to the next frame selection signal by means of a sound generator and video display.

In general then, a preferred method for instruction of a student which includes interactive guidance of the student through a series of lesson frames comprises the steps of: providing the student with an instructional keyboard having a plurality of keys, each capable of generating a key relation signal in response to key actuation; providing a sound generator for generating audio tones and a video controller for displaying video images on a video display having an audio tone generating means associated therewith enabling the student to respond to the visually displayed images and audio tones by selecting one or more of the keyboard keys; presenting the student with a lesson frame containing a video image requiring a performance response by the student at the keyboard; comparing the student keyboard response with an absolute performance standard and generating an absolute performance evaluation result; comparing the absolute performance evaluation result with an acceptable achievement level for the particular lesson frame and generating a next frame selection signal in response to the comparison; and, presenting to the student a next frame based upon the next frame selection signal.

An example of the above invention operating in Play Along presentation mode for the instruction of a student in music theory and/or the playing of a musical instrument, will now be described.

Play Along presentation mode is an operating mode for the preferred embodiment of the invention described above that includes a portion of the program of the apparatus including a module that puts music notation on a display screen, allows the student to play the music on the keyboard, and records what notes (keys) the student played for later use.

The Play Along video normally displays, from top to bottom, two or more Grandstaffs of music and a picture of the keyboard. Several other elements may replace portions of this normal display, and various pointers and indicators can provide realtime progress information to the student via the video display screen. The input to the Play Along module is an Ideal note stream, a pointer to the appropriate screen(s) of music, and a set of operational flags that describe how the module is to behave. The output is the stream of signals generated by the student at the keyboard.

The output is evaluated by the evaluator, or main Lesson Engine, and control is directed, as described above, from there to an appropriate next instructional lesson frame. Control may pass directly back to Play Along, should the Lesson Engine decide that the student should just try the piece or piece fragment again.

Normally, the student responds to the music shown on the screen in time with a metronome, and a visually displayed pointer moves along the music to indicate what should be played. The student is responsible to play in time with the metronome. If the student makes a mistake, he has to catch up with the pointer. Preferably, the pointer does not try to mimic the student's actions. The evaluator uses a program that completes a simple runtime analysis to determine if: a) the student is playing something; b) the student is showing signs of frustration, as for example, by hitting all of the keys at once; or, c) the student has quit playing. If there is more than one screen of music, the next screen is displayed automatically by the program when the student reaches an appropriate point in the music based upon the music shown on the screen.

This runtime analysis is the comparison performed by the evaluator device under the control of the program to select the appropriate next lesson frame for display to the student.

While this is only a single, non-exclusive example of the type of lesson frame that may be displayed to the student in the course of instruction, it is indicative of the other instructional modes, such as games, that are available as teaching tools to better instruct the student.

Figure 5:
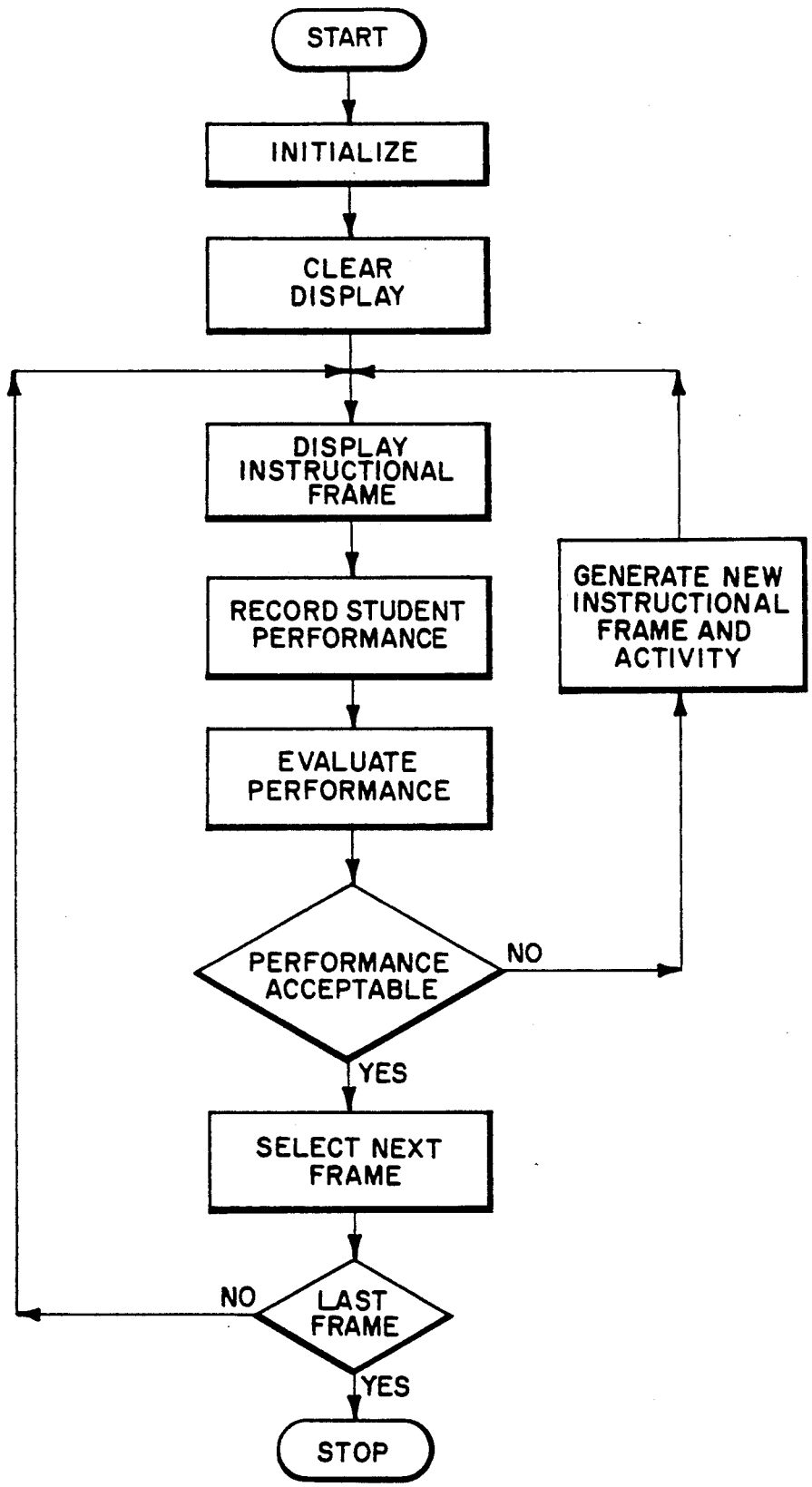
FIG. 5 shows a flowchart of the control program of the invention.

FIG. 5 is a flowchart of the control program of the present invention that controls selection of the instructional frames presented the student during use of the invention in the musical keyboard instructional mode discussed above.

With reference being made to FIG. 5, it is seen that the control program begins by initializing the system to update any and all flags necessary to place the student either at the beginning of the instructional programming, or to continue from whatever point in the instructional programming is chosen.

The display visible to the student is then cleared and the first instructional frame chose for study is displayed for the student. After this frame is displayed, the control program then invokes the evaluator subroutine that is responsible for evaluating the student's responses to the activity being presented in the displayed instructional frame against both an internally stored set of perfect responses, preferably broken into a number of individual parameters representing various items of interest such as: correct key depression, duration of kay depression, pitch, etc., and then against a second number of individual parameters correlating with the first set of parameters representing an acceptable achievement level for the activity presented in the displayed instructional frame. The result of this comparison is sent as an input to the next subroutine called by the control program, the Next Frame Selector, which selects, based upon this comparison input, the next most appropriate instructional frame that correlated to an instructional activity designed to correct the most serious deviation noted in the above comparisons. This selection process is then an interactive activity between the student's performance of the activity and the control program's evaluation of the student's responses. Thus, the control program interacts with and dependent upon the student to select the next instructional frame presented, so that any two students may have a different sequence of instructional frames presented them by the invention based upon their differing interactions in responding to the initial series of instructional activities and frames presented them by the invention.

As usual, once all the instructional frames are presented and no further activity is available for student presentation, the control program terminates its activities.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. An apparatus for instruction of a student which includes interactive guidance of the student through a series of lesson frames, each containing an instructional task for the student to complete, by comparing the student's performance to the task in the lesson frame with both a set of absolute performance responses and with acceptable performance responses for the task, comprising:
   (a) keyboard means having a plurality of manually operable keys for generating at least one key relation signal in response to the actuation of each key, said key relation signal corresponding to and representative of a reference key number;
   (b) storage means having a predetermined program contained therein, said program including a sequence of code signals representing a series of instructional frames, each frame including 1) a first signal group of signals representing an instructional activity to which the student responds, with a first portion of said group corresponding to an audio display and a second portion corresponding to a video display, 2) a second signal group of signals associated therewith representing desired values for the student response to the activity corresponding to represent an acceptable achievement level, 3) a sequence of substantially perfect performance responses for said instructional activities presented in all of said frames;

(c) evaluator means connected to said keyboard means, and to said storage means, for generating for each said frame a performance signal representing the results of a comparison between said series of key relation signals and said performance responses, said evaluator means also generating for each frame a next frame selection signal representing a next frame that is discriminately selected as a result of a comparison between said performance signal and said second group of signals representing an acceptable achievement level for said associated instructional activity in each said frame;

(d) control means connected to said storage means and to said evaluator means for generating audio control signals and video control signals to present to the student both aurally and visually, the next instructional frame in accordance with said next frame selection signal generated by the last comparison;

(e) sound generator means connected to said control means for producing audible sounds in response to said audio control signals; and, (f) video display means connected to said control means for producing a visually displayed image to the student response to said video control signals.

2. An apparatus a in claim 1 wherein said sequence of substantially perfect performance responses for said instructional activities in said frames comprises a first group of parameters including categories corresponding to correct key response, timing between played keys, duration of played key and overall duration of played task.

3. An apparatus as in claim 2 wherein said first group of parameters all carry equal weight in generating said performance signal representing the results of a comparison between said key relation signals and said performance responses.

4. An apparatus as in claim 2 wherein said first group of parameters carry unequal weight in generating said performance signal representing the results of a comparison between said key relation signals and said performance responses.

5. An apparatus as in claim 2 wherein said second group of signals associated with said frames representing desired values for the student response to the activity corresponding to represent an acceptable achievement level, comprises a second group of parameters having categories corresponding to said categories in said first group of parameters.

6. An apparatus as in claim 5 wherein said categories in said second group of parameters are assigned predetermined weights for use in determining said next frame selection signal as a result of said comparison between said performance signal and said second group of signals representing an acceptable achievement level for said associated instructional activity in each said frame.

7. An apparatus as in claim 6 wherein said assigned predetermined weights are selected to correspond to said first signal group of signals representing an instructional activity for said frames.

8. An apparatus as in claim 1 wherein said keyboard means further generates a signal corresponding to an audible sound for each key corresponding to the notes on a musical scale.

9. An apparatus as in claim 1 further including input/output means connected to said storage means and to said control means for entering external signals into, or exiting internal signals from, said storage and control means.

10. An apparatus a sin claim 1 further including memory means connected to said keyboard means, to said evaluator means and to said control means for storing said key relation signals generated by said keyboard means.

11. A method for instruction of a student which includes interactive guidance of the student through a series of lesson frames, each containing an instructional task for the student to complete, by comparing the student's performance to the task in the lesson frame with both a set of absolute performance responses and with acceptable performance responses for the task, comprising:

(a) providing keyboard means having a plurality of manually operable keys for generating at least one key relation signal in response to the actuation of each key, said key relation signal corresponding to and representative of a reference key number;

(b) providing storage means having a predetermined program contained therein, said program including a sequence of code signals representing a series of instructional frames, each frame including 1) a first signal group of signals representing an instructional activity to which the student responds, with a first portion of said group corresponding to an audio display and a second portion corresponding to a video display, 2) a second signal group of signals associated therewith representing desired values for the student response to the activity corresponding to represent an acceptable achievement level, 3) a sequence of substantially perfect performance responses for said instructional activities presented in all of said frames;

(c) providing evaluator means connected to said keyboard means, and to said storage means, for generating for each said frame a performance signal representing a next frame that is discriminately selected as a result of a comparison between said series of key relation signals and said performance responses, said evaluator means also generating for each frame a next frame selection signal representing the results of a comparison between said performance signal and said second group of signals representing an acceptable achievement level for said associated instructional activity in each said frame;

(d) providing control means connected to said storage means and to said evaluator means for generating audio control signals and video control signals to present to the student both aurally and visually, the next instructional frame in accordance with said next frame selection signal generated by the last comparison;

(e) providing sound generator means connected to said control means for producing audible sounds in response to said audio control signals; and, (f) providing video display means connected to said control means for producing a visually displayed image to the student response to said video control signals.

12. A method for instruction of a student which includes interactive guidance of the student through a series of lesson frames comprising the steps of:

providing the student with a keyboard having a plurality of keys corresponding to the notes of a musical scale and generating at least one key relation signal in response to the actuation of each key;

providing means for generating audio tones and displaying video images on a video display means having an audio tone generating mans associated therewith enabling the student to respond to the visually displayed images and audio tones by selecting one or more of said keys;

presenting the student with a lesson frame representing an instructional activity requiring a response by the student on said keyboard;

comparing said student keyboard response with a performance standard and generating an absolute performance evaluation result;

comparing said absolute performance evaluation result with an acceptable achievement level for said instructional activity and generating a next frame selection signal; and selecting a next frame for presenting to the student discriminately selected by said next frame selection signal.

13. An apparatus for instruction of a student which includes interactive guidance of the student through a series of lesson frames, each containing an instructional task for the student to complete, by comparing the student's performance to the task in the lesson frame with both a set of absolute performance responses and with acceptable performance responses for the task, comprising:

(a) musical instrument means having a plurality of manually operable note identification response means for generating at least one note identification relation signal in response to the actuation of each note identification response means, said note identification relation signal corresponding to and representative of a reference key number;

(b) storage means having a predetermined program contained therein, said program including a sequence of code signals representing a series of instructional frames, each frame including 1) a first signal group of signals representing an instructional activity to which the student responds, with a first portion of said group corresponding to an audio display and a second portion corresponding to a video display, 2) a second signal group of signals associated therewith representing desired values for the student response to the activity corresponding to represent an acceptable achievement level, 3) a sequence of substantially perfect performance responses for said instructional activities presented in all of said frames;

(c) evaluator means connected to said musical instrument means, and to said storage means, for generating for each said frame a performance signal representing a next frame that is discriminately selected as a result of a comparison between said series of note identification relations signals and said performance responses, said evaluator means also generating for each frame a next frame selection signal representing the results of a comparison between said performance signal and said second group of signals representing an acceptable achievement level for said associated instructional activity in each said frame;

(d) control means connected to said storage means and to said evaluator means for generating audio control signals and video control signals to present to the student both aurally and visually, the next instructional frame in accordance with said next frame selection signal generated by the last comparison;

(e) sound generator means connected to said control means for producing audible sounds in response to said audio control signals; and, (f) video display means connected to said control means for producing a visually displayed image to the student response to said video control signals.

14. An apparatus as in claim 13 wherein said sequence of substantially perfect performance responses for said instructional activities in said frames comprises a first group of parameters including categories corresponding to correct note response, timing between played notes, duration of played notes and overall duration of played task.

15. An apparatus as in claim 14 wherein said first group of parameters all carry equal weight in generating said performance signal representing the results of a comparison between said note identification relation signals and said performance responses.

16. An apparatus as in claim 14 wherein said first group of parameters carry unequal weight in generating said performance signal representing the results of a comparison between said note identification relation signals and said performance responses.

17. An apparatus as in claim 14 wherein said second group of signals associated with said frames representing desired values for the student response to the activity corresponding to represent an acceptable achievement level, comprises a second group of parameters having categories corresponding to said categories in said first group of parameters.

18. An apparatus as in claim 17 wherein said categories in said second group of parameters are assigned predetermined weights for use in determining said next frame selection signal as a result of said comparison between said performance signal and said second group of signals representing an acceptable achievement level for said associated instructional activity in each said frame.

19. An apparatus as in claim 18 wherein said assigned predetermined weights are selected to correspond to said first signal group of signals representing an instructional activity for said frames.

20. An apparatus as in claim 13 wherein said musical instrument means further generates a signal corresponding to an audible sound for each note identification means corresponding to the notes on a musical scale.

21. An apparatus as in claim 13 further including input/output means connected to said storage means and to said control means for entering external signals into, or exiting internal signals from, said storage and control means.

22. An apparatus as in claim 13 further including memory means connected to said musical instrument means, to said evaluator means and to said control means for storing said note identification relation signals generated by said musical instrument means.

23. An apparatus as in claim 13 wherein said musical instrument means comprises a brass wind instrument.

24. An apparatus as in claim 13 wherein said musical instrument means comprises a reed wind instrument.

25. An apparatus as in claim 13 wherein said musical instrument means comprises a string instrument.

26. An apparatus as in claim 25 wherein said musical instrument means comprises a guitar fretboard.

27. An apparatus as in claim 13 wherein said musical instrument means comprises a percussion instrument.

28. An apparatus as in claim 13 wherein said musical instrument means comprises an electronic sensing drumpad.

29. A method for instruction of a student which includes interactive guidance of the student through a series of lesson frames comprising the steps of:

providing the student with a musical instrument means having a plurality of note identification means for generating at least one note identification signal in response to the actuation of each note identification means, said note identification signal corresponding to the notes of a musical scale;

providing means for generating audio tones and displaying video images on a video display means having an audio tone generating means associated therewith enabling the student to respond to the visually displayed images and audio tones by selecting to actuate one or more of said note identification means of said musical instrument means;

presenting the student with a lesson frame representing an instructional activity requiring a response by the student on said musical instrument means;

comparing said note identification signal with a performance standard and generating an absolute performance evaluation standard;

comparing said absolute performance evaluation result with an acceptable achievement level for said instructional activity and generating a next frame selection signal; and selecting a next frame for presenting to the student discriminately selected by said next frame selection signal.

* * * * *